US009129602B1

(12) United States Patent
Shepard et al.

(10) Patent No.: US 9,129,602 B1
(45) Date of Patent: Sep. 8, 2015

(54) MIMICKING USER SPEECH PATTERNS

(71) Applicant: Amazon Technologies, Inc., Reno, NV (US)

(72) Inventors: Isaac Jeremy Shepard, Ladera Ranch, CA (US); Brian David Fisher, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 196 days.

(21) Appl. No.: 13/715,859

(22) Filed: Dec. 14, 2012

(51) Int. Cl.
*G10L 15/187* (2013.01)
*G10L 15/22* (2006.01)

(52) U.S. Cl.
CPC ........................................ *G10L 15/22* (2013.01)

(58) Field of Classification Search
CPC ........................................ G10L 15/187
USPC ........................................ 704/270, 205
See application file for complete search history.

(56) References Cited

U.S. PATENT DOCUMENTS 4,980,917 A * 12/1990 Hutchins ........................ 704/254
4,991,216 A * 2/1991 Fujii et al. ........................ 704/254
6,236,965 B1 * 5/2001 Kim et al. ........................ 704/254
6,275,799 B1 * 8/2001 Iso ........................ 704/244
7,089,178 B2 * 8/2006 Garudadri et al. ............ 704/205
8,571,242 B2 * 10/2013 Bachler et al. ................ 381/316

* cited by examiner

*Primary Examiner* — Susan McFadden
(74) *Attorney, Agent, or Firm* — Novak Druce Connolly Bove + Quigg LLP

(57) ABSTRACT

Approaches are described for generating an audio signal that mimics speech captured a computing device. An input audio signal (e.g., a speech signal) can be transformed from the time domain into another domain, to generate one or more audio signal segments, where each segment can correspond to a window of time. The device can then determine, for each audio signal segment, a feature characteristic of the audio signal, such as a phoneme. Each one of segments can be mapped, based at least in part on the respective feature characteristic, to a model audio signal. The device can then generate an output audio signal including each model audio signal as determined by the mapping, where the output audio signal is in a sequence associated with the input audio signal.

20 Claims, 6 Drawing Sheets

MIMICKING USER SPEECH PATTERNS

BACKGROUND

As computing devices offer increasing processing capacity and functionality, users are able to operate these devices in an expanding variety of ways. For example, users can utilize audio recording and playback devices to record then playback the recorded audio signal using an application that transforms or modifies the recorded audio. Conventionally, these applications transform the audio by applying one or more filters or other modifications to the input audio signal, where each filter can adjust a playback speed, volume level, or add a sound effect (e.g., morph or change a voice) to the input audio signal, among others. These approaches often sound computer-generated, or are otherwise limited in their ability to replicate speech or other audio input in a way that sounds to a user as if the modified speech was originally produced or recorded by a character or other such entity.

BRIEF DESCRIPTION OF THE DRAWINGS

Various embodiments in accordance with the present disclosure will be described with reference to the drawings, in which.

DETAILED DESCRIPTION

Figure 1A:
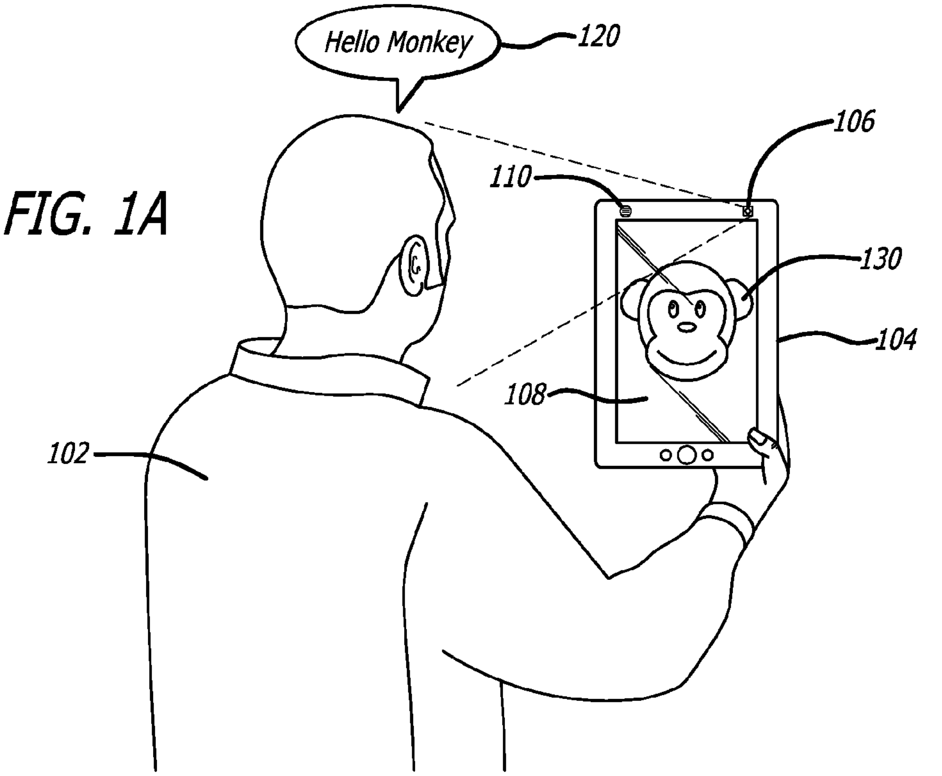
FIGS. 1A-1B illustrate an example situation in which speech produced by a user can be replicated by a character displayed on a computing device, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for processing an audio signal by an electronic device. In particular, various embodiments enable a computing device (e.g., a mobile phone, tablet computer, etc.) or other electronic device to receive an input audio signal (e.g., a speech signal), and generate an output audio signal based at least in part on patterns or information in the input audio signal. For example, a user can interact with a software application (such as a game or other application) operating on a device by speaking into the device, were the device can produce an output audio signal that mimics the speech of the user, but sounds as though it were "spoken" by a specific character or voice. In this situation, the output audio signal "spoken" by the character can be generated by combining speech segments (e.g., words or speech in the character's voice) obtained from a library that are mapped to patterns or information in the user's speech signal.

In accordance with various embodiments, an input audio signal generated by a user or other source can be captured by a computing device, where the input audio signal can be captured at an audio input component of the device, such as a microphone coupled to an analog-to-digital (A/D) converter. The microphone can be configured to receive the input audio signal while the A/D converter can sample the input audio signal to convert the signal into a digital audio signal suitable for further processing. For example, the input audio signal can be transformed from the time domain into another domain, e.g., the frequency domain using a fast Fourier transform (FFT) or other operation, to generate one or more digital audio signal segments, where each segment can correspond to a determined or variable window of time. The digital audio signal segments can be representative of a set of speech samples (such as vowel sounds) that occur sequentially in time, where each speech sample can be identified by a frequency distribution. Further, each of the windows of time can correspond to a respective portion of the input audio signal.

The device can determine, for each digital audio signal segment, a feature characteristic of the input audio signal, such as a frequency distribution, that can be indicative of a vowel phoneme, other phoneme, or any other unit of language. Each of the segments can be mapped, based at least in part on the feature characteristic, to a phoneme model. In accordance with an embodiment, a library can be provided that includes one or more phoneme models, where a phoneme model is a predetermined speech segment, such as a sound recording. An example phoneme can be a sound recording of a person speaking the vowel "a". In various embodiments, each phoneme model can be associated with voice data, where the voice data can change the way in which the phoneme sounds or is "spoken". The device can then generate an output audio signal by combining phoneme models from the library that are mapped to the feature characteristics of the input audio signal.

Various other functions and advantages are described and suggested below as may be provided in accordance with the various embodiments.

As mentioned above, in some instances, a user may desire to playback an input audio signal that mimics what the user is saying, for example, without the audio signal sounding like it is just a modified recording of the user. Conventional methods for producing such a signal include transposing or distorting the input audio signal to generate an output audio signal with different or unusual frequencies, such as by selectively changing the frequency of the input audio signal to a rate higher or lower than the input frequency of the signal, and/or modifying the pitch or gain of the signal, among others. However, these approaches, and others like them, merely modify the existing input audio signal, such as in the case of a speech signal, to generate substantially the same speech signal with effects, where these effects can create a monotone voice, deep voice, female voice, melodious voice, whisper voice, etc. In accordance with various embodiments, systems and methods described herein can enable a computing device to generate an output audio signal that mimics the speech of the user, but sounds as though it were "spoken" by a specific character or voice.

Figure 1B:
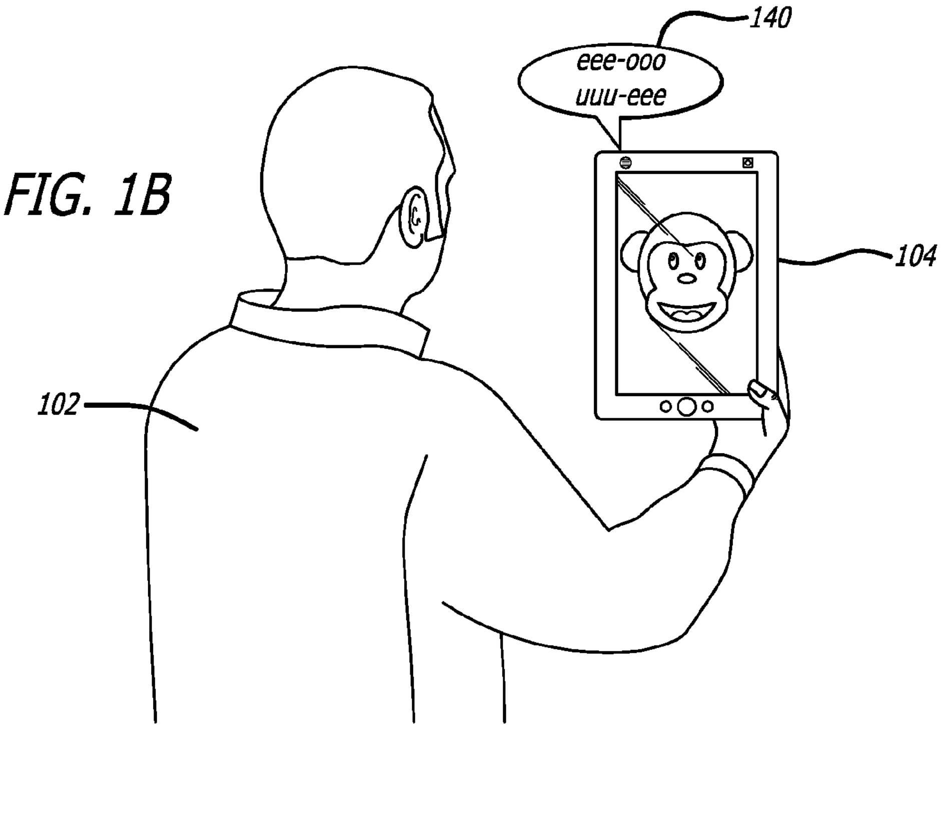

FIGS. 1A-1B illustrate an example situation in which speech produced by a user can be replicated by a character displayed on a computing device, in the voice of the character, in accordance with an embodiment. As shown in FIG. 1A, a user 102 is holding a portable computing device 104, such as a tablet. In the illustrated embodiment, the user is interacting with a software application (e.g., a game) operating on the device, where in this example a character in the game (e.g., a monkey) 130 can appear to be interacting with the user such as by speaking to (or along with) the user. For example, in response to receiving an input audio signal (such as a speech signal) from the user, the device can generate an output audio signal based at least in part on features of the input audio signal, and play the output audio signal to the user such that the speech is replicated using the character's voice but maintaining the tones, inflections, accent, or other aspects of the input audio signal.

Figure 5:
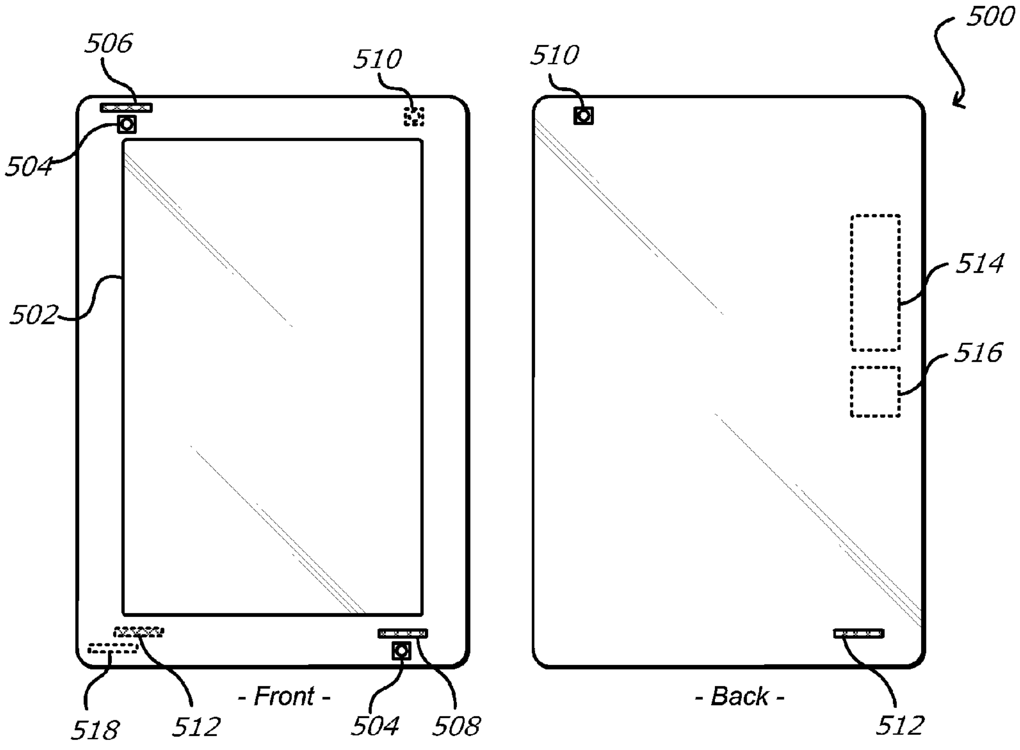
FIG. 5 illustrates front and back views of an example portable computing device that can be used in accordance with various embodiments.
Figure 6:
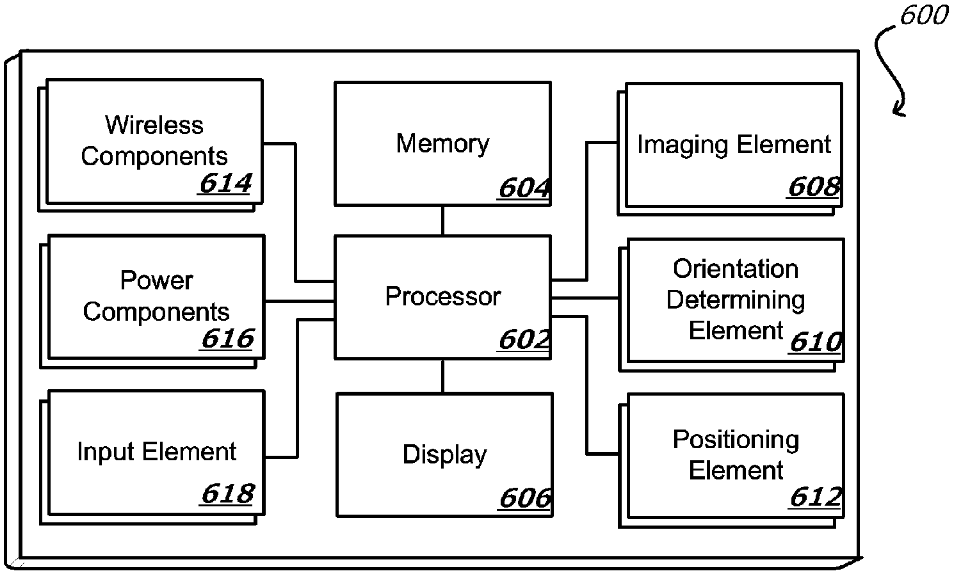
FIG. 6 illustrates an example set of basic components of a portable computing device, such as the device described with respect to FIG. 5.
Figure 7:
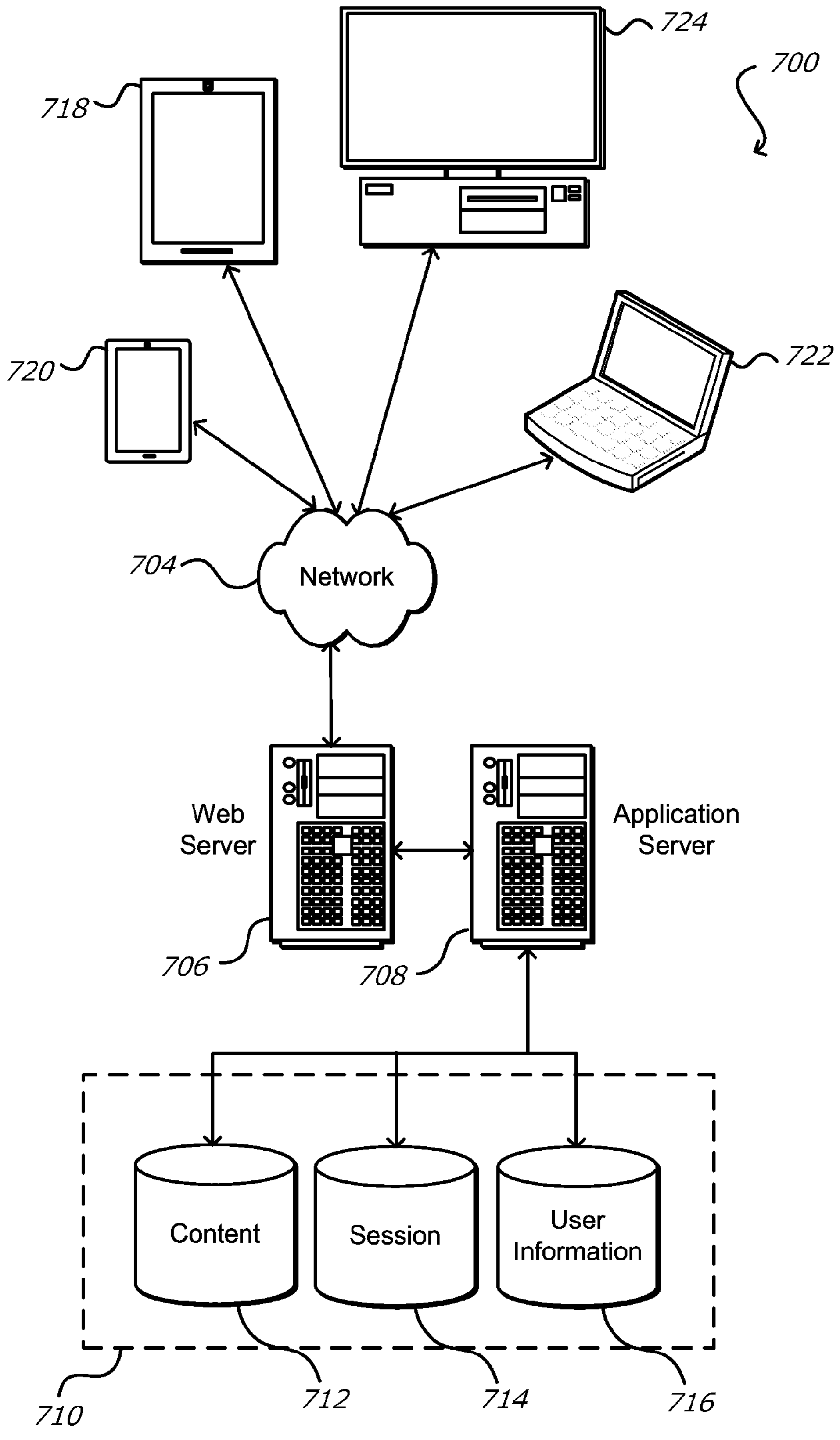
FIG. 7 illustrates an example of an environment for implementing aspects in accordance with various embodiments.

As mentioned, although a tablet is shown it should be understood that any electronic device capable of receiving, determining, and/or processing an audio signal can be used in accordance with various embodiments discussed herein, where the devices can include, for example, mobile phones, notebook computers, personal data assistants, among others. The device, in this example, can include at least one camera (e.g., a front and/or rear-facing camera) 106, an interface (e.g., a display element) 108 that displays an application or service (e.g., an interactive speech mimicking game), and at least one microphone 110 and/or speaker. FIGS. 5-7 illustrate additional placement and/or operation of the camera, microphone, and speaker, which can be utilized in accordance with various embodiments. The device can further include one or more internal processing components (not shown), such as an analog-to-digital (A/D) converter; an audio processing engine; and a time domain conversion module. Further components both related and not related to analysis and modification of the input audio signal, according to various embodiments, may also be included in the device.

The user, in this example, interacts with the monkey character by speaking to the device, e.g., by saying "Hello Monkey" 120. At a high level, the device obtains the user's speech signal and plays an output audio signal that mimics the user's speech "Hello Monkey", but in the monkey's voice. In this case, the monkey "speaks back" to the user "eee-ooo uuu-eee". As will be evident in the embodiments described herein, the output audio signal "spoken" by the monkey is generated by combining phoneme models (e.g., "monkey talk") obtained from a library that are mapped to patterns in the user's speech signal. As will be described further, the patterns can be an identifiable characteristic of the user's speech signal, such as a vowel sound. The vowel sound can be identified by analyzing patterns of the user's speech signal in the time domain and comparing detected patterns to known patterns (such as known vowel sound patterns). Additionally or alternatively, the vowel sound in the user's speech signal can be identified by analyzing the user's speech signal in the frequency domain, detecting patterns (such as a frequency distribution), and comparing the detected frequency distribution to known frequency distributions. As further described herein, the library contains various phoneme models, where the phoneme models are stored sound bites, such as the sound for the vowel "a". One or more phoneme models can be combined to generate an output audio signal, such as in the case of a series of vowel sounds bites. The output audio signal can have a character's voice, by applying voice data to the phoneme models.

In the illustrated embodiment, more specifically, the microphone of the device can be configured to receive the input audio signal (i.e., "Hello Monkey") while the A/D converter can sample the input audio signal to convert the signal into a digital audio signal suitable for further processing. The audio processing engine can transform the input audio signal from the time domain into the frequency domain using a fast Fourier transform (FFT) to generate one or more digital audio signal segments, where each segment can correspond to a determined or variable window of time, such as on the order of about 100 milliseconds. In accordance with various embodiments, determining the size of each window or segment can be accomplished in any number of ways. For example, fixed length windows can be used based at least in part on characteristics of human speech, such as the frequency characteristics of certain phonemes. In various another embodiments, wavelet decomposition can be used to determine the size of each window segments.

Subsequent processing of each segment can be performed, segment by segment, to identify a feature characteristic of the segment (e.g., a frequency distribution), and based on the feature characteristic of the segment, the presence of a phoneme (e.g., a vowel phoneme) can be determined. In accordance with an embodiment, a frequency distribution can include a fundamental frequency, harmonic components, and one or more formants. In accordance with other embodiments, a phoneme is the smallest unit of sound in a given language that changes the meaning of a word, such as a vowel, and English has approximately 31 to 38 phonemes. It should be noted that while the term phoneme is used for purposes of explanation, units of speech other than a phoneme can be used in the various embodiments described herein.

The audio processing engine can determine a vowel phoneme (e.g., a, e, i, o, u, etc.) based at least upon the frequency distribution for each segment by comparing the frequency distribution of a segment to known frequency distributions of vowel phonemes. For example, a vowel phoneme has a frequency distribution based on a vowel phoneme type (e.g., "a" or "e"). That is, vowel phoneme "a" will have a different frequency distribution than vowel phoneme "e". Accordingly, by comparing the frequency distribution of a segment to known frequency distributions that are associated with a vowel phoneme, the vowel phoneme type of each segment can be determined. In other embodiments, the audio processing engine can determine a vowel phoneme based on the fundamental frequency for each segment by comparing the fundamental frequency of a segment to known fundamental frequencies, where each of the known fundamental frequencies corresponds to a vowel phoneme. It should be noted that any number of standard techniques can be used to determine the fundamental frequency. For example, in one such technique, the fundamental frequency can be the frequency having the greatest amplitude. It should be further noted that any pattern matching algorithm can be used to determine a similarity between frequency distribution data in a segment to one of a plurality of known frequency distributions of vowel phonemes, where a similarity above a determined threshold between any one of the known frequency distributions of vowel phonemes can be indicative of a matching.

Upon analyzing each segment of the input audio signal to determine the vowel phoneme type, the determined vowel phoneme for each segment is mapped to a corresponding phoneme model stored in a library. In accordance with an embodiment, the library can include one or more phoneme models, where a phoneme model can be a speech segment, such as a sound recording. As described above, an example phoneme model can be a sound recording of a person speaking the vowel "a". Each phoneme model can be associated with one or more different versions, where each version can have a different timing/length, character voice, pitch, etc. associated therewith. In various other embodiments, each phoneme model can be associated with one of a plurality of different voice data, where any one of the different voice data can be applied to the phoneme models to change the way in which the phoneme sounds, such as the intonation of the phoneme. For example, each one of the different voice data can correspond to a character's voice, and applying the voice data can make a phoneme model appear to be "spoken" by a specific character or voice.

The determined vowel phoneme for each segment is mapped to a corresponding vowel phoneme model in the library. In this way, the determined vowel phonemes in the input audio signal "Hello Monkey" (i.e., "e", "o", "u", "e") are mapped to a phoneme model having a corresponding vowel phoneme. For example, the vowel phonemes in "Hello Monkey" (i.e., "e", "o", "u", "e") can be mapped to corresponding phoneme models "e", "o", "u" and "e".

The device can then generate an output audio signal by combining phoneme models from the library that are mapped to the determined phonemes in the input audio signal, where the output audio signal is in a sequence and with timing associated with the input audio signal. The combined phoneme models, when played, mimic the speech of the user but in the voice of the monkey, such as by applying monkey voice data to the combined phoneme models. Thus, in this case, the monkey would "speak" "eee-ooo uuu-eee". For example, as shown in FIG. 1B, upon receiving the input audio signal "Hello Monkey", the monkey character can speak the output audio signal "eee-ooo uuu-eee" 140, in the voice of the monkey. The output audio signal matches the pace and way (e.g., the timing and pitch) in which the user spoke the words, but in a way that sounds as if the audio was generated by the device and not just a modified version of the input audio signal. For example, the output audio signal can be pitch shifted to match the pattern or otherwise mimic the pitch of the input audio signal. In this case, the fundamental frequency for each phoneme model used to generate the output audio signal is shifted to match (with some allowable tolerances) the pattern of fundamental frequencies of the input audio signal. In another embodiment, the length or timing of the output audio signal is matched to the length or timing of the input audio signal so that the output audio signal matches the way in which the user spoke the words.

Figure 2A:
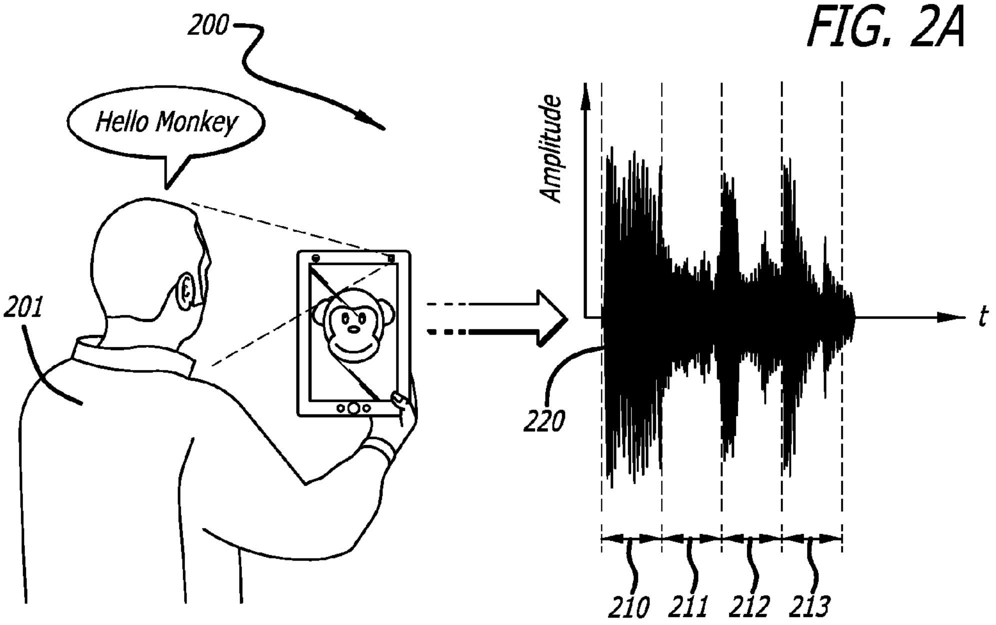
FIGS. 2A-2B illustrate an example implementation for processing an audio signal, such as may correspond to user speech, in accordance with an alternate embodiment.
Figure 2B:
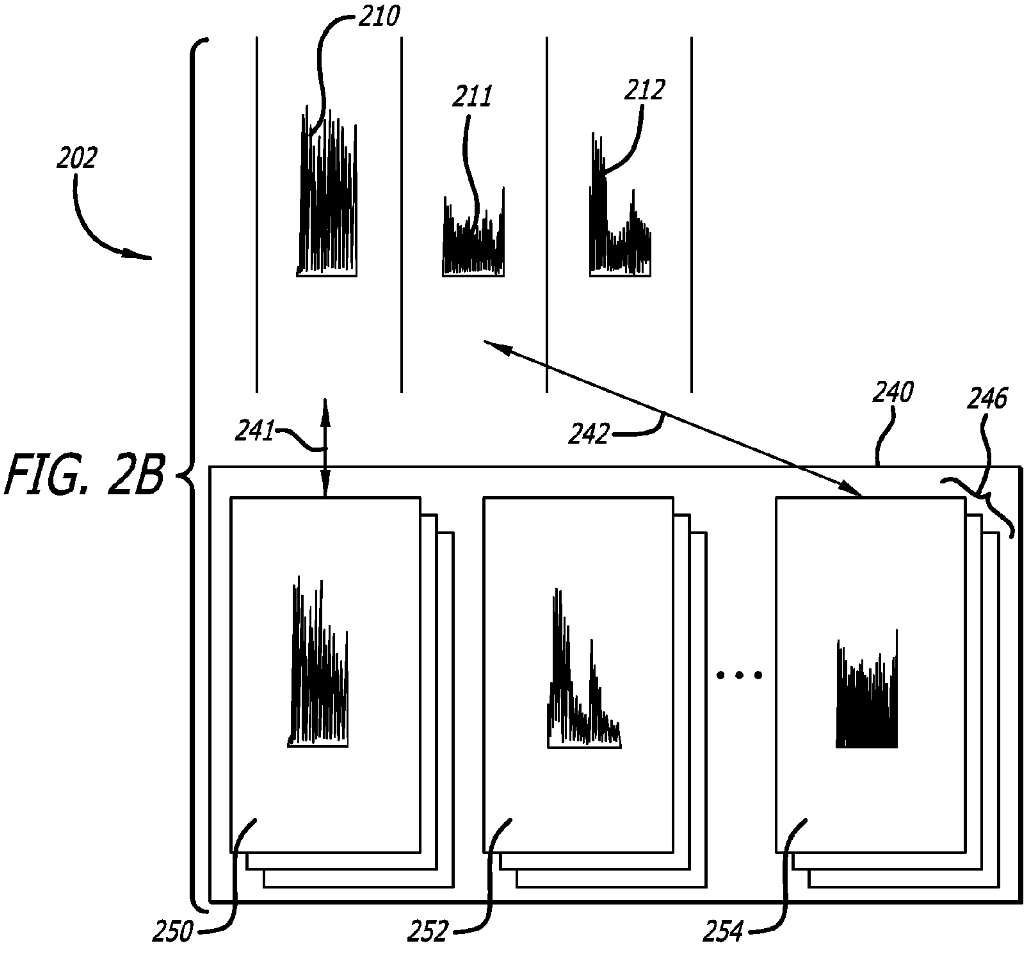

FIGS. 2A-2B illustrate an example implementation for processing an input audio signal, such as may correspond to user speech, in accordance with an alternate embodiment. In the illustrated embodiment, a first process 200 of obtaining the input audio signal, and a second process 202 of matching one or more digital audio segments of the input audio signal to corresponding phoneme models in a library, is illustrated.

As shown in FIG. 2A, an input audio signal, such as the speech signal "Hello Monkey" described with reference to FIG. 1A, is spoken by a user 201. The input audio signal is received by a microphone of a computing device, and an A/D converter can sample the input audio signal to convert the signal into a digital audio signal 220. In accordance with an embodiment, an audio processing engine of the computing device can be configured to decompose the digital audio input signal into one or more digital audio segments 210-213, each segment corresponding to a particular window of time. In some embodiments, certain detected amplitudes of the digital audio input signal can be used to segment the signal. For example, detected amplitudes can be used to determine when something spoken begins and when something spoken ends, and the 'begin' and 'end' determination can be used to segment the digital audio input signal.

The digital audio signal segments can be representative of a set of speech samples (such as vowel sounds) that occur sequentially in time. Processing of each segment can be performed, segment by segment, to identify a feature characteristic of the segment (e.g., a frequency distribution), and based on the feature characteristic of the segment, the presence of a phoneme (e.g., a vowel phoneme) can be determined. For example, an audio processing engine or other engine can determine a vowel phoneme (e.g., a, e, i, o, u, etc.) based at least upon the frequency distribution for each segment by comparing the frequency distribution of a segment to known frequency distributions of vowel phonemes. Accordingly, by comparing the frequency distribution of a segment to known frequency distributions that are associated with a vowel phoneme, the vowel phoneme type of each segment can be determined.

Upon analyzing each segment of the input audio signal to determine the vowel phoneme type, each of the segments can be mapped, based at least in part on the feature characteristic, to a phoneme model stored in a library, such as library 240. For example, as shown in FIG. 2B, segment 211 can be mapped 242 to phoneme model 254, and segment 210 can be mapped 241 to phoneme model 250 because, e.g., it is determined that the vowel phoneme in audio segment 211 corresponds to the same vowel phoneme in phoneme model 254, and the vowel phoneme in audio segment in 210 corresponds to the same vowel phoneme model 250.

As shown in FIG. 2B, library 240 includes phoneme models 250, 252, and 254 that can be determined offline, for example, based on a phoneme model training set (described further below). Phoneme model 250 can correspond to vowel phoneme "e", phoneme model 252 can correspond to vowel phoneme "o", and phoneme model 254 can correspond to vowel phoneme "u". Library 240 can also include voice data (not shown) that can be applied to each phoneme model to change the way the phoneme model sounds. For example, in the case of a game, the phoneme models can have a special voice that can be used to distinguish one character from another (such as monkey, bear, frog, etc.). Each phoneme model can have one or more versions associated therewith. As shown, phoneme model 254 has at least three versions 246. Each version can have different information associated therewith that can affect the timing, pitch, or other "speech" qualities of phoneme, such as in the case of representing a long "u" sound such as "uuuu", or a short "u" sound such as "uu". In other embodiments, multiple versions for a phoneme model are not stored in the library, rather, the device can be used to modify each phoneme model, such as by repeating the phoneme model to match the timing of an input audio signal, or modifying the fundamental frequency of the phoneme model to match the pitch pattern of the input audio signal.

In accordance with an embodiment, the phoneme model training set can be a set of known phonemes, such as vowel phonemes that are spoken and analyzed for a feature characteristic of the spoken vowel phoneme. For example, a training input audio signal (such as the vowel sound "a") can be specifically spoken into a device, where the training input audio signal can be digitized. An operator can reproduce the digitized input audio signal using a digital to analog converter, an amplifier, and a speaker to audibly confirm that the digitized input audio signal satisfactorily represents the training input audio signal. If the digitized input audio signal is either visually or audibly unacceptable, the operator may vary the initialization parameters to improve the training input audio signal. For example, if it is visually observed that certain vowels or utterances are at a much lower amplitude level than others, the gain of the amplifier used prior to digitization may be adjusted. Thereafter, for each training input audio signal (such as the vowel sound "a"), a feature characteristic of the training input audio signal is added to the library as a phoneme model. This process is repeated for each vowel sound, where each determined feature characteristic is added to the library as a phoneme model.

It should be noted that the process described with reference to FIGS. 2A-2B is described with reference to the frequency domain, and in various other embodiments, a similar process can be accomplished in the time domain. For example, the signal pattern represented by the input audio signal in each segment of signal 220 can be compared to a time domain representation of model vowel phonemes using pattern recognition algorithms, where a match can be determined when a similarity value meets at least a predetermined threshold for each comparison.

Figure 3:
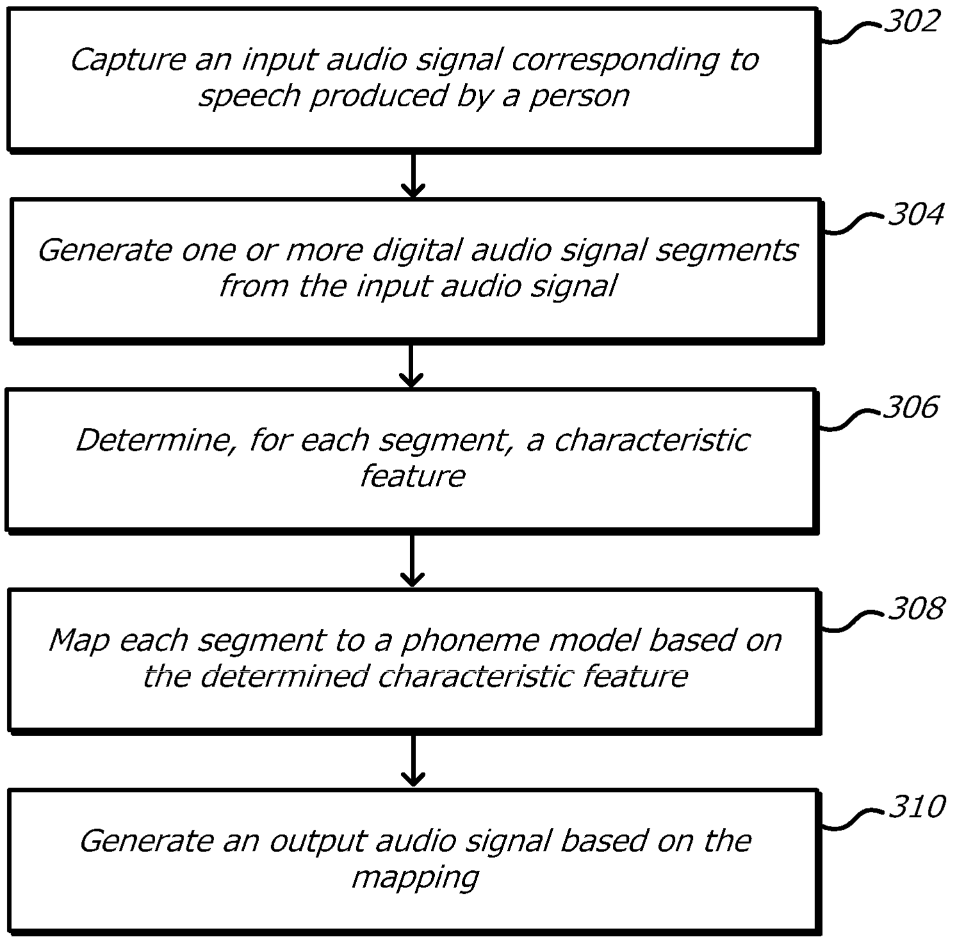
FIG. 3 illustrates an example process for processing an audio signal, in accordance with various embodiments.

FIG. 3 illustrates an example process for determining user input to a mobile device, in accordance with various embodiments. It should be understood that, for any process described herein, that there can be additional or fewer steps performed in similar or alternative orders, or in parallel, within the scope of the various embodiments unless otherwise stated. At step 302, an input audio signal corresponding to speech produced by a person within a detection distance of a computing device is captured. The person, or user, can be interacting with a software application (e.g., a game) operating on the device, where a character in the game (e.g., a monkey) can appear to be interacting with the user such as by speaking to or along with the user. For example, in response to receiving an input audio input signal (such as a speech signal) from the user saying "Hello Monkey", the device can generate an output audio signal based at least in part on the input audio signal from the user, and play the output audio signal to the user in the character's voice, such as by speaking "eee-ooo uuu-eee".

At step 304, the input audio signal can be transformed from the time domain into another domain, e.g., the frequency domain using a fast Fourier transform (FFT) or other operation, to generate one or more digital audio signal segments. The digital audio signal segments can be representative of a set of speech samples (such as vowel sounds) that occur sequentially in time, where each speech sample can be identified by a frequency distribution. Further, each of the windows of time can correspond to a respective portion of the input audio signal.

At step 306, each segment can be processed, segment by segment, to identify a feature characteristic of the segment (e.g., a frequency distribution), and based on the feature characteristic of the segment, the presence of a phoneme (e.g., a vowel phoneme) can be determined. As mentioned, a frequency distribution can include a fundamental frequency, harmonic components, and one or more formants, and a vowel phoneme (e.g., a, e, i, o, u, etc.) can be determined based at least upon the frequency distribution for each segment by comparing the frequency distribution of a segment to known frequency distributions of vowel phonemes.

In other embodiments, a phoneme type can be determined for each segment based on the fundamental frequency of each segment. For example, determining a phoneme type associated with a segment can include performing a FFT on the segment, determining a fundamental frequency using any one of the standard approaches available for the segment; determining a magnitude of one or more lower fundamental frequency for the segment; determining whether the fundamental frequency is at least a threshold magnitude greater than the lower fundamental frequencies; normalizing the lower fundamental frequencies to the fundamental frequency; and determining, based at least in part on the normalized fundamental and lower fundamental frequencies, a phoneme type for the segment. In this way, it is possible to determine the highest distinction for broad categories of vowel phoneme types to determine what a particular phoneme type looks like.

It should be noted that the lower fundamental frequencies can be normalized to the fundamental frequency using any one of the standard techniques known in the art. For example, the lower fundamental frequencies can be normalized to the fundamental frequency based on the amplitude of the frequencies, or based on how the frequencies are represented. In any situation, the normalized frequencies can be used to determine a phoneme independent of the pitch associated with the input audio signal.

At step 308, the determined vowel phoneme for each segment is mapped to a corresponding vowel phoneme model in the library. In this way, the determined vowel phonemes in the input audio signal "Hello Monkey" (i.e., "e", "o", "u", "e") can each be mapped to a phoneme model having a corresponding vowel phoneme. For example, the vowel phonemes in "Hello Monkey" (i.e., "e", "o", "u", "e") can be mapped to corresponding phoneme models "e", "o", "u" and "e". At step 310, an output audio signal including each model audio signal as determined by the mapping is generated, where the output audio signal is in a sequence associated with the audio signal. The combined phoneme models, when played, mimic the speech of the user but in the voice of the monkey, such as by applying monkey voice data to the combined phoneme models. A time domain conversion module can convert the output audio signal from a frequency domain into time domain for output as an audio output signal. Thereafter, the output audio signal can be played back to the user. For example, upon receiving the input speech "Hello Monkey", the device can playback the output audio signal "eee-ooo uuu-eee" in the character's own sounds or language, where the output audio signal is in a sequence associated with the input speech and has a similar timing and/or length to the detected vowels in the input speech.

In accordance with other embodiments, the user can interact with the character (i.e., the device) in a number of other ways. For example, the device can respond to other audio input signals, such as a clap, siren, sneeze, cough or any other detectable sound, where the character (i.e., the device) can play back a similar sound in the characters own language in accordance with the embodiments described herein, and/or respond through use of a facial expression, such as by looking in the direction (or away) from the user in a surprised or other emotional state (e.g., happy, sad, etc.).

As mentioned, a user is interacting with a software application on a portable computing device, where upon speaking to the device, the device can generate an output audio signal based at least in part on the audio signal from the user, and play the output audio signal to the user. In accordance with various embodiments, other applications are possible based on the teachings herein. For example, the device can recognize a melody from a preset list of melodies (e.g., through correlation or some other algorithm), and can "finish" the melody when the speech input signal ends, in the same intonation as the input.

In another embodiment, upon recognizing the melody, the device can begin playing the melody from the beginning when the input signal has reached a specific point in the melody (such as halfway), such that the output audio signal is in effect playing the same song in rounds with the input signal. In another embodiment, upon detecting a sound, song or melody, the device can continue to play the sound at the same time as the input sound at a frequency that harmonizes with the input frequency, such as the perfect fifth.

Figure 4:
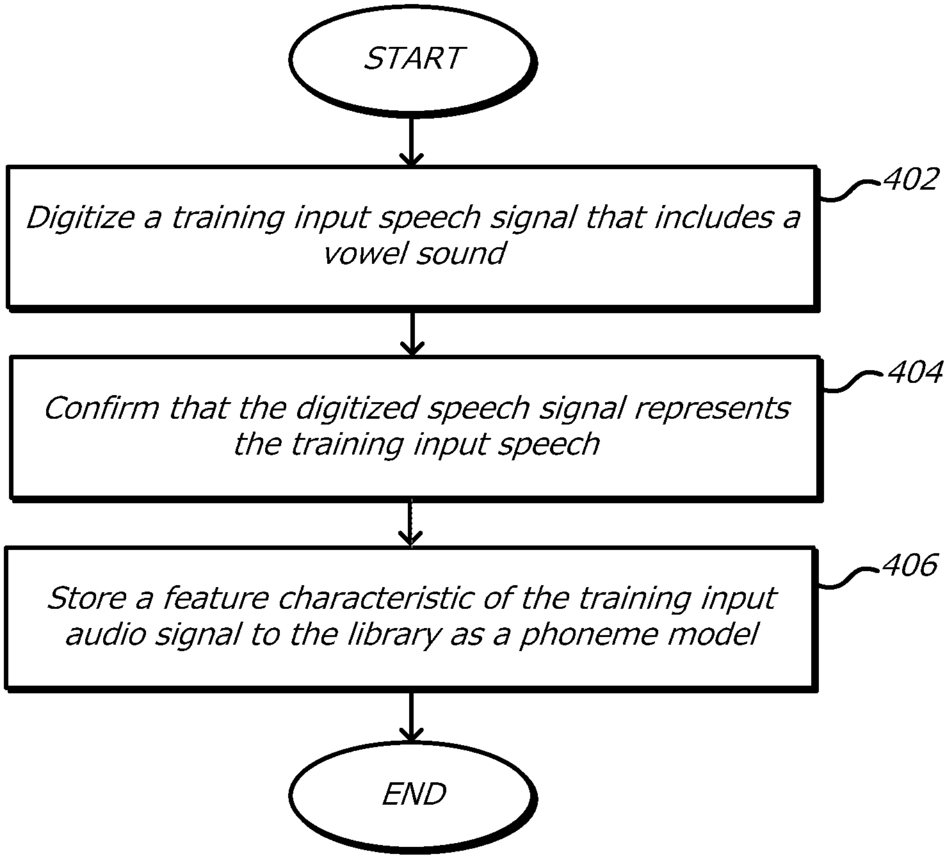
FIG. 4 illustrates an example process for determining a training set for use in determining one or more phonemes from an audio signal, in accordance with various embodiments.

FIG. 4 illustrates an example process for determining a training set for use in determining one or more phonemes from an input audio signal, in accordance with various alternate embodiments. As described above, the embodiments described herein can include at least an offline process and an online process. The offline process can include determining a library of phoneme models, and the online process can include mapping detected feature characteristics in an input audio signal to the phoneme models in the library. In accordance with an embodiment, the phoneme models to which each segment in the input signal is mapped can be based at least in part on a phoneme training set, where the phoneme training set can be a set of known phonemes, such as vowel phonemes, that have been predetermined and stored as a phoneme model.

At step 402, a training input audio signal that includes a vowel sound can be digitized, and the digitized input audio signal can be displayed. At step 404, an operator (such as a trainer set operator) can reproduce the digitized input audio signal using a digital to analog converter, an amplifier, and a speaker to audibly confirm that the digitized input audio signal represents the training input audio signal. If the digitized audio input signal is either visually or audibly unacceptable, the operator may vary the initialization parameters to improve the digitized input audio signal.

At step 406, for each acceptable training input audio signal (such as the vowel sound "a"), a feature characteristic of the training input audio signal is stored to the library as a phoneme model. The process can be repeated for each vowel sound, where each determined feature characteristic is added to the library as a phoneme model. It should be noted that any number of techniques can be used to generate a training set, where any technique that generates a set of data (e.g., a known set phonemes) can used to discover potentially predictive relationships, such as a mapping between an audio segment and a model audio signal.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element (s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
- under the control of one or more computer systems configured with executable instructions,
  - receiving an audio signal, at least a portion of the audio signal corresponding to speech data;
  - analyzing the audio signal to determine a plurality of phonemes represented in the audio signal;
  - determining a voice pattern corresponding to each of the plurality of phonemes;
  - determining a fundamental frequency of the audio signal;
  - determining a phoneme type corresponding to the fundamental frequency, wherein the phoneme type is one of a plurality of vowel phoneme types; and
  - generating an output audio signal including each of the voice patterns in a sequence associated with the audio signal.

2. The computer implemented method of claim 1, wherein analyzing the audio signal further includes:
- performing a fast Fourier transform (FFT) on at least a portion of the audio signal for each of a plurality of windows of time;
- determining, for each of the windows of time, a feature characteristic of the audio signal; and
- for each of the windows of time, determining a phoneme from the plurality of phonemes corresponding to the feature characteristic.

3. The computer implemented method of claim 2,
- determining, for each window of time, a similarity measure between the feature characteristic and each one of the phonemes in the plurality of phonemes using at least one pattern matching algorithm;
- determining the similarity measure having a value greater than any other similarity measure; and
- mapping the phoneme from the plurality of phonemes to the portion of the audio signal for the window of time having the value greater than any other similarity measure.

4. The computer implemented method of claim 1, wherein determining a voice pattern corresponding to each of the plurality of phonemes further includes:
- performing a fast Fourier transform (FFT) on at least a portion of the audio signal for each of a plurality of windows of time;
- determining a frequency having a highest amplitude among each of the plurality of windows of time, the amplitude being above a determined threshold;
- determining, in response to the frequency being above the determined threshold, one of a plurality of phonemes being represented in the audio signal for each of the plurality of windows of time; and
- mapping each determined phoneme to a voice pattern.

5. The computer implemented method of claim 1, further comprising:
- determining a pitch pattern associated with the audio signal;
- accessing one of a plurality of voice patterns stored in a library; and
- mapping each determined phoneme to a corresponding voice pattern stored in the library based at least in part on the pitch pattern associated with the audio signal.

6. The computer implemented method of claim 1, wherein each of the plurality of phonemes corresponds to one of a plurality of vowel phonemes, and wherein the voice pattern is a voice signal corresponding to a vowel sound having a predetermined intonation.

7. The computer implemented method of claim 1, further comprising:
- performing a fast Fourier transform (FFT) on the audio signal, the audio signal including at least one vowel sound;
- receiving a confirmation that the audio signal represents the at least one vowel sound; and
- causing the at least one vowel sound to be stored as one of a plurality of voice patterns.

8. The computer implemented method of claim 1, further comprising:
- receiving an audio signal, the audio signal corresponding to a portion of a melody, wherein the portion of the melody is less than an entire melody;
- analyzing the audio signal to recognize the melody from a plurality of stored melodies;
- determining an intonation associated with the melody; and
- generating an output audio signal, the output audio signal having a same intonation as the intonation of the audio signal, wherein the output audio signal completes the melody from an end of the portion of the melody.

9. The computer implemented method of claim 1, further comprising:
- receiving an audio signal, the audio signal corresponding to a portion of a melody;
- analyzing the audio signal to recognize the melody from a plurality of stored melodies; and
- generating an output audio signal in response to detecting a specific point in the melody being received, wherein the output audio signal corresponds to a beginning portion of the melody.

10. The computer implemented method of claim 1, further comprising:
- determining an audio signal length for each of the plurality of phonemes;
- accessing a plurality of voice patterns stored in a library; and mapping each of the plurality of phonemes to a corresponding voice pattern stored in the library based at least in part on the audio signal length of each of the plurality of phonemes.

11. A computing system, comprising:

at least one processor; and memory including instructions that, when executed by the processor, cause the computing system to:

receive an audio signal, at least a portion of the audio signal corresponding to speech data;

analyze the audio signal to determining a plurality of phonemes represented in the audio signal;

determine a voice pattern corresponding to each of the plurality of phonemes;

access one of a plurality of voice patterns stored in a library; and map each determined phoneme to a corresponding voice pattern stored in the library; and generate an output audio signal including each of the voice patterns in a sequence associated with the audio signal.

12. The computing system of claim 11, wherein the instructions, when executed, further cause the computing device to:

perform a fast Fourier transform (FFT) on at least a portion of the audio signal for each of a plurality of windows of time;

determine, for each of the windows of time, a feature characteristic of the audio signal; and for each of the windows of time, determining a phoneme from the plurality of phonemes corresponding to the feature characteristic.

13. The computing system of claim 11, wherein the instructions, when executed, further cause the computing device to:

receive an audio signal, the audio signal corresponding to a portion of a melody;

analyze the audio signal to recognize the melody from a plurality of stored melodies;

determine an intonation associated with the melody; and generate an output audio signal in response to detecting a specific point in the melody being received, the output audio signal having a same intonation as the intonation of the audio signal, wherein the output audio signal continues the melody from the specific point in the melody.

14. The computing system of claim 11, wherein the instructions, when executed, further cause the computing device to:

perform a fast Fourier transform (FFT) on at least a portion of the audio signal for each of a plurality of windows of time;

determine a frequency having a highest amplitude among each of the plurality of windows of time, the amplitude being above a determined threshold;

determine, in response to the frequency being above the determined threshold, one of a plurality of phonemes being represented in the audio signal for each of the plurality of windows of time; and map each determined phoneme to a voice pattern.

15. The computing system of claim 11, wherein the instructions, when executed, further cause the computing device to:

determine a pitch pattern associated with the audio signal;

access one of a plurality of voice patterns stored in a library; and map each determined phoneme to a corresponding voice pattern stored in the library based at least in part on the pitch pattern associated with the audio signal.

16. The computing system of claim 15, wherein the instructions, when executed, further cause the computing device to:

receive an audio signal, the audio signal corresponding to a portion of a melody, wherein the portion of the melody is less than an entire melody;

analyze the audio signal to recognize the melody from a plurality of stored melodies;

determine an intonation associated with the melody; and generate an output audio signal, the output audio signal having a same intonation as the intonation of the audio signal, wherein the output audio signal completes the melody from an end of the portion of the melody.

17. A non-transitory computer readable storage medium storing one or more sequences of instructions executable by one or more processors to perform a set of operations comprising:

receiving an audio signal, at least a portion of the audio signal corresponding to speech data;

analyzing the audio signal to determining a plurality of phonemes represented in the audio signal;

determining a voice pattern corresponding to each of the plurality of phonemes; and generating an output audio signal including each of the voice patterns in a sequence associated with the audio signal;

wherein each of the plurality of phonemes corresponds to one of a plurality of vowel phonemes, and wherein the voice pattern is a voice signal corresponding to a vowel sound having a predetermined intonation.

18. The non-transitory computer readable storage medium of claim 17, further comprising instructions executed by the one or more processors to perform the operations of:

determine at least one fundamental frequency and one or more harmonic frequencies associated with the fundamental frequency; and in response to analyzing the fundamental frequency and one or more harmonic components, determine a phoneme type corresponding to the fundamental frequency, wherein the phoneme type is one of a plurality of vowel phoneme types.

19. The non-transitory computer readable storage medium of claim 17, further comprising instructions executed by the one or more processors to perform the operations of:

performing a fast Fourier transform (FFT) on the audio signal, the audio signal including at least one vowel sound;

receiving a confirmation that the audio signal represents the at least one vowel sound; and causing the at least one vowel sound to be stored as one of a plurality of voice patterns.

20. The non-transitory computer readable storage medium of claim 17, further comprising instructions executed by the one or more processors to perform the operations of:

receiving an audio signal, the audio signal corresponding to a portion of a melody;

analyzing the audio signal to recognize the melody from a plurality of stored melodies; and generating an output audio signal in response to detecting a specific point in the melody being received, wherein the output audio signal corresponds to a beginning of the melody.

* * * * *